US012807176B2

(12) United States Patent
Choi et al.

(10) Patent No.: US 12,807,176 B2
(45) Date of Patent: Nov. 24, 2026

(54) APPARATUS FOR CONTROLLING AUTONOMOUS DRIVING AND A METHOD THEREOF BASED ON A FILTER COEFFICIENT OF AN ADAPTIVE FILTER

(71) Applicants: HYUNDAI MOTOR COMPANY, Seoul (KR); KIA CORPORATION, Seoul (KR); HYUNDAI AUTOEVER Corp., Seoul (KR)

(72) Inventors: Jin Ha Choi, Suwon-si (KR); Bong Ju Kim, Yongin-si (KR)

(73) Assignees: HYUNDAI MOTOR COMPANY, Seoul (KR); KIA CORPORATION, Seoul (KR); HYUNDAI AUTOEVER Corp., Seoul (KR)

( * ) Notice: Subject to any disclaimer, the term of this patent is extended or adjusted under 35 U.S.C. 154(b) by 214 days.

(21) Appl. No.: 18/221,265

(22) Filed: Jul. 12, 2023

(65) Prior Publication Data

US 2024/0199063 A1 Jun. 20, 2024

(30) Foreign Application Priority Data

Dec. 14, 2022 (KR) ........................ 10-2022-0175195

(51) Int. Cl.
*B60W 60/00* (2020.01)
*B60W 50/04* (2006.01)
*B60W 50/00* (2006.01)

(52) U.S. Cl.
CPC ............ *B60W 60/00* (2020.02); *B60W 50/04* (2013.01); *B60W 2050/0052* (2013.01); *B60W 2420/403* (2013.01); *B60W 2420/408* (2024.01); *B60W 2556/45* (2020.02)

(58) Field of Classification Search
CPC .............................. B60W 60/00; B60W 50/04
See application file for complete search history.

(56) References Cited

U.S. PATENT DOCUMENTS 5,936,361 A * 8/1999 Yamashita ......... H05B 41/2925 315/83
6,205,401 B1 * 3/2001 Pickhard ................ G01C 21/28 701/472
2015/0241244 A1 * 8/2015 Hsu ...................... G01C 21/183 702/150

(Continued)

*Primary Examiner* — Jess Whittington
(74) *Attorney, Agent, or Firm* — Lempia Summerfield Katz LLC

(57) ABSTRACT

The autonomous driving control apparatus may identify that a filter coefficient is changed, may store the changed filter coefficient in the memory when the filter coefficient is changed from a pre-defined filter coefficient threshold value to a specified value or more, may apply the filter coefficient, which is stored in the memory, to the adaptive filter, may perform autonomous driving control logic by using the sensor based on a specified input signal, may compare an output signal, which is output as a result of performing the autonomous driving control logic, with signal strength threshold value, and may store, in the memory, the filter coefficient applied to the adaptive filter, the specified input signal, the output signal, or a combination of the filter coefficient, the specified input signal, and the output signal when a strength of the output signal exceeds the output signal strength threshold value.

18 Claims, 7 Drawing Sheets

(56) References Cited

U.S. PATENT DOCUMENTS

| | | | | |
|---|---|---|---|---|
| 2015/0241245 | A1* | 8/2015 | Hsu | G01C 21/16 73/1.77 |
| 2018/0031697 | A1* | 2/2018 | Harris | G01S 7/023 |
| 2018/0302102 | A1* | 10/2018 | Oshima | H03H 21/0012 |
| 2021/0397885 | A1* | 12/2021 | Sivaraman | G06V 20/47 |
| 2022/0068253 | A1* | 3/2022 | Pignier | G10K 11/17854 |
| 2022/0169306 | A1* | 6/2022 | Ramanujam | B62D 5/0463 |

* cited by examiner

APPARATUS FOR CONTROLLING AUTONOMOUS DRIVING AND A METHOD THEREOF BASED ON A FILTER COEFFICIENT OF AN ADAPTIVE FILTER

CROSS-REFERENCE TO RELATED APPLICATION

This application claims the benefit of and priority to Korean Patent Application No. 10-2022-0175195, filed in the Korean Intellectual Property Office on Dec. 14, 2022, the entire contents of which are incorporated herein by reference.

TECHNICAL FIELD

The present disclosure relates to an autonomous driving control apparatus and a method thereof, and more particularly, relates to a technology for adaptively compensating for a filter coefficient applied to at least one sensor for autonomous driving control of a host vehicle.

BACKGROUND

Various error correction processes are being developed for an autonomous driving of a vehicle. For example, a device that performs autonomous driving control includes at least one filter, and technologies for adaptively changing (or compensating for) a coefficient used for an operation of a filter are being developed.

As the type or amount of data required for the autonomous driving control gradually increases, the number of required filters is gradually increasing. In particular, at least one adaptive filter may be used to remove a noise signal generated during processing.

However, as the number of adaptive filters included in an autonomous driving control apparatus increases, it is difficult to analyze safety effects during a manufacturing process. In particular, as the number of adaptive filters increases, the number of factors to be processed or considered increases accordingly. As a result, it is difficult to implement a consistent and highly reliable autonomous driving system.

SUMMARY

The present disclosure has been made to solve the above-mentioned problems occurring in the prior art while advantages achieved by the prior art are maintained intact.

An aspect of the present disclosure provides an autonomous driving control apparatus that determines whether to change a filter coefficient based on a magnitude of the changed value when a filter coefficient of an adaptive filter for controlling at least one sensor is changed. The present disclosure also provides a method thereof.

An aspect of the present disclosure provides an autonomous driving control apparatus that compares an output signal strength threshold value stored in a memory with the strength of the output signal output as the result of executing autonomous driving control logic to change the filter coefficient. The present disclosure also provides a method thereof.

An aspect of the present disclosure provides an autonomous driving control apparatus that uses at least one specified input signal among a plurality of input signals to execute autonomous driving control logic. The present disclosure also provides a method thereof.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, an autonomous driving control apparatus may include a sensor device including at least one sensor, a memory configured to store one or more instructions, and a controller operatively connected to the sensor device and the memory. For example, when executed by the controller, the instructions may cause the autonomous driving control apparatus to identify that a filter coefficient of at least one adaptive filter for controlling the at least one sensor is changed. The instructions may also cause the autonomous driving control apparatus to store the changed filter coefficient in the memory when the filter coefficient is changed from a predefined filter coefficient threshold value to a specified value or more. The instructions may also cause the autonomous driving control apparatus to apply the filter coefficient, which is stored in the memory, to the at least one adaptive filter. The instructions may also cause the autonomous driving control apparatus to perform autonomous driving control logic by using the at least one sensor based on a specified input signal. The instructions may also cause the autonomous driving control apparatus to compare an output signal, which is output as a result of performing the autonomous driving control logic, with an output signal strength threshold value stored in the memory. The instructions may also cause the autonomous driving control apparatus to store, in the memory, at least one of the filter coefficient applied to the at least one adaptive filter, the specified input signal, the output signal, or a combination of the filter coefficient, the specified input signal, and the output signal when a strength of the output signal exceeds the output signal strength threshold value.

According to an embodiment, when executed by the controller, the instructions may cause the autonomous driving control apparatus to perform the autonomous driving control logic using the at least one sensor, by using the specified input signal including an input signal, which is associated with one of data storage system for automated driving (DSSAD), event data recorders (EDR), or a combination of the DSSAD and the EDR, from among a plurality of input signals stored in the memory.

According to an embodiment, when executed by the controller, the instructions may cause the autonomous driving control apparatus to perform the autonomous driving control logic by using the at least one sensor by setting a strength of the specified input signal to a maximum value or a minimum value among input signal strengths stored in the memory.

According to an embodiment, when executed by the controller, the instructions may cause the autonomous driving control apparatus to perform the autonomous driving control logic using the at least one sensor, by using the specified input signal corresponding to a sinusoidal alternating current signal. The sinusoidal alternating current signal includes a maximum value and a minimum value among input signal strengths stored in the memory as an inflection point.

According to an embodiment, when executed by the controller, the instructions may cause the autonomous driving control apparatus to release an output signal strength limit of the autonomous driving control logic. The instructions may also cause the autonomous driving control apparatus to determine whether the strength of the output signal output by performing the autonomous driving control logic exceeds the output signal strength threshold value stored in the memory.

According to an embodiment, the at least one sensor may include at least one of a camera sensor, a radar sensor, a LiDar sensor, or a combination of the camera sensor, the radar sensor, and the LiDar sensor.

According to an embodiment, when executed by the controller, the instructions may cause the autonomous driving control apparatus to correct the filter coefficient of the at least one adaptive filter based on at least one of a calibration value of the at least one sensor, a reliability of sensor data obtained through the at least one sensor, or a combination of the calibration value and the reliability of the sensor data.

According to an embodiment, when executed by the controller, the instructions may cause the autonomous driving control apparatus to apply the filter coefficient, which is stored in the memory, to the at least one adaptive filter when it is identified that a host vehicle stops driving and turns off a start.

According to an embodiment, when executed by the controller, the instructions may cause the autonomous driving control apparatus to transmit, to an external device, at least one of the filter coefficient, the specified input signal, the output signal, or a combination of the filter coefficient, the specified input signal, and the output signal when the strength of the output signal exceeds the output signal strength threshold value. The instructions may also cause the autonomous driving control apparatus to receive update information about the at least one adaptive filter from the external device.

According to an embodiment, when executed by the controller, the instructions may cause the autonomous driving control apparatus to update the pre-defined filter coefficient threshold value based on the update information and to allow a constant power supply BAT of a host vehicle to be turned off.

According to an aspect of the present disclosure, an autonomous driving control method may include identifying, by a controller, that a filter coefficient of at least one adaptive filter for controlling at least one sensor is changed. The autonomous driving control method may also include storing, by the controller, the changed filter coefficient in a memory when the filter coefficient is changed from a pre-defined filter coefficient threshold value to a specified value or more. The autonomous driving control method may also include applying, by the controller, the filter coefficient, which is stored in the memory, to the at least one adaptive filter. The autonomous driving control method may also include performing, by the controller, autonomous driving control logic by using the at least one sensor based on a specified input signal. The autonomous driving control method may also include comparing, by the controller, an output signal, which is output as a result of performing the autonomous driving control logic, with an output signal strength threshold value stored in the memory. The autonomous driving control method may also include storing, by the controller, at least one of the filter coefficient applied to the at least one adaptive filter, the specified input signal, the output signal, or a combination of the filter coefficient, the specified input signal, and the output signal in the memory, when a strength of the output signal exceeds the output signal strength threshold value.

According to an embodiment, the performing, by the controller, of the autonomous driving control logic by using the at least one sensor based on the specified input signal may include performing the autonomous driving control logic using the at least one sensor, by using the specified input signal including an input signal, which is associated with one of DSSAD, EDR, or a combination of the DSSAD and the EDR, from among a plurality of input signals stored in the memory.

According to an embodiment, the performing, by the controller, of the autonomous driving control logic by using the at least one sensor based on the specified input signal may include performing the autonomous driving control logic by using the at least one sensor by setting a strength of the specified input signal to a maximum value or a minimum value among input signal strengths stored in the memory.

According to an embodiment, the performing, by the controller, of the autonomous driving control logic by using the at least one sensor based on the specified input signal may include performing the autonomous driving control logic using the at least one sensor, by using the specified input signal corresponding to a sinusoidal alternating current signal. The sinusoidal alternating current signal includes a maximum value and a minimum value among input signal strengths stored in the memory as an inflection point.

According to an embodiment, the comparing, by the controller, of the output signal, which is output as the result of performing the autonomous driving control logic, with the output signal strength threshold value stored in the memory may include releasing an output signal strength limit of the autonomous driving control logic and determining whether a strength of the output signal output by performing the autonomous driving control logic exceeds the output signal strength threshold value stored in the memory.

According to an embodiment, the at least one sensor may include at least one of a camera sensor, a radar sensor, a LiDar sensor, or a combination of the camera sensor, the radar sensor, and the LiDar sensor.

According to an embodiment, the autonomous driving control method may further include correcting the filter coefficient of the at least one adaptive filter based on at least one of a calibration value of the at least one sensor, a reliability of sensor data obtained through the at least one sensor, or a combination of the calibration value and the reliability of the sensor data.

According to an embodiment, the applying, by the controller, of the filter coefficient, which is stored in the memory, to the at least one adaptive filter may include applying the filter coefficient, which is stored in the memory, to the at least one adaptive filter when it is identified that a host vehicle stops driving and turns off a start.

According to an embodiment, the autonomous driving control method may further include transmitting, to an external device, at least one of the filter coefficient, the specified input signal, the output signal, or a combination of the filter coefficient, the specified input signal, and the output signal when the strength of the output signal exceeds the output signal strength threshold value and receiving update information about the at least one adaptive filter from the external device.

According to an embodiment, the autonomous driving control method may further include updating the pre-defined filter coefficient threshold value based on the update information and allowing a constant power supply BAT of a host vehicle to be turned off.

BRIEF DESCRIPTION OF THE DRAWINGS

The above and other objects, features, and advantages of the present disclosure should be more apparent from the following detailed description taken in conjunction with the accompanying drawings.

Figure 1:
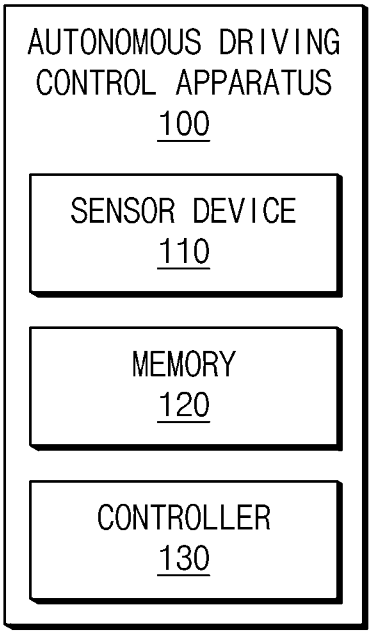
FIG. 1 is a block diagram showing components of an autonomous driving control apparatus, according to an embodiment of the present disclosure.

With regard to description of drawings, the same or similar components are marked by the same or similar reference signs.

DETAILED DESCRIPTION

Hereinafter, some embodiments of the present disclosure are described in detail with reference to the accompanying drawings. In adding reference numerals to components of each drawing, it should be noted that the same or equivalent components have the same reference numerals, although the components are indicated on another drawing. Furthermore, in describing the embodiments of the present disclosure, detailed descriptions associated with well-known functions or configurations have been omitted when the detailed descriptions may make subject matters of the present disclosure unnecessarily obscure.

In describing elements of an embodiment of the present disclosure, the terms first, second, A, B, (a), (b), and the like may be used herein. These terms are only used to distinguish one element from another element and do not limit the corresponding elements irrespective of the nature, order, or priority of the corresponding elements. Furthermore, unless otherwise defined, all terms including technical and scientific terms used herein should be interpreted as customary in the art to which the present disclosure belongs. It should be understood that terms used herein should be interpreted as having a meaning that is consistent with their meanings in the context of the present disclosure and the relevant art and should not be interpreted in an idealized or overly formal sense unless expressly so defined herein.

Hereinafter, various embodiments of the present disclosure are described in detail with reference to FIGS. 1-7.

FIG. 1 is a block diagram showing components of an autonomous driving control apparatus, according to an embodiment of the present disclosure.

According to an embodiment, an autonomous driving control apparatus 100 may include at least one of a sensor device 110, a memory 120, a controller 130, or any combination thereof.

The autonomous driving control apparatus 100 shown in FIG. 1 is an example, and embodiments of the present disclosure are not limited thereto. In an embodiment, the autonomous driving control apparatus 100 may further include a display device.

According to an embodiment, the sensor device 110 may include at least one sensor.

For example, the sensor device 110 may include at least one of a camera sensor, a radar sensor, a LiDar sensor, or any combination thereof.

For example, the sensor device 110 may obtain pieces of data necessary for autonomous driving control of a host vehicle.

For example, at least one sensor included in the sensor device 110 may operate based on the control of at least one sensor controller included in the autonomous driving control apparatus 100. For example, the camera sensor may operate based on the control of a camera sensor controller included in the autonomous driving control apparatus 100. For example, the camera sensor controller may obtain an adaptive filter coefficient for controlling a camera sensor from the controller 130 and may obtain various pieces of data through the camera sensor based on the obtained adaptive filter coefficient.

For example, the sensor device 110 may obtain various pieces of data for performing autonomous driving control logic based on a specified input signal.

According to an embodiment, the memory 120 may store instructions or data. For example, the memory 120 may store one or more instructions that cause the autonomous driving control apparatus 100 to perform various operations when executed by the controller 130.

For example, the memory 120 and the controller 130 may be implemented as one chipset. The controller 130 may include at least one of a communication processor or a modem.

For example, the memory 120 may store various pieces of information related to the autonomous driving control apparatus 100. For example, the memory 120 may store information about the operation history of the controller 130. For example, the memory 120 may store information related to states and/or operations of components (e.g., at least one of an engine control unit (ECU), the sensor device 110, the controller 130, or any combination thereof) of the host vehicle.

For example, the memory 120 may store various pieces of data related to the execution of autonomous driving control logic.

For example, the memory 120 may store a filter coefficient.

For example, the memory 120 may store a threshold value of signal strength and/or a filter coefficient. For example, the memory 120 may store a predefined filter coefficient threshold value. For example, the memory 120 may store an output signal strength threshold value.

For example, the memory 120 may store at least one input signal. For example, the memory 120 may store an input signal associated with one of data storage system for automated driving (DSSAD), event data recorders (EDR), or any combination thereof.

For example, the memory 120 may store a plurality of input signals having different input signal strengths.

According to an embodiment, the controller 130 may be operatively connected to at least one of the sensor device 110, the memory 120, or any combination thereof. For example, the controller 130 may control the operation of the sensor device 110 and/or the memory 120.

In one embodiment, while the host vehicle is driving in an autonomous driving mode, the controller 130 may identify that a parameter related to at least one sensor of the sensor device 110 is changed.

In one embodiment, the controller 130 may identify that a filter coefficient of at least one adaptive filter for controlling the at least one sensor included in the sensor device 110 is changed.

In one embodiment, the controller 130 may determine whether the filter coefficient of the adaptive filter is changed from a pre-defined filter coefficient threshold value to a specified value or more. For example, the controller 130 may determine whether the filter coefficient increases from a pre-defined filter coefficient threshold value to a specific value or more or decreases to a specific value or less. For example, the pre-defined filter coefficient threshold value may be a setting value changeable by a user.

When the filter coefficient is changed from the pre-defined filter coefficient threshold value to the specified value or more, the controller 130 may store the changed filter coefficient in the memory 120.

In one embodiment, the controller 130 may apply the filter coefficient (or a changed filter coefficient) stored in the memory 120 to at least one adaptive filter for controlling the sensor device 110.

In one embodiment, when the start of the host vehicle is turned off, the controller 130 may apply the changed filter coefficient to at least one adaptive filter for controlling at least one sensor to execute a self-diagnosis process of the autonomous control logic for the host vehicle.

In one embodiment, the controller 130 may perform autonomous driving control logic by using at least one sensor based on a specified input signal.

In one embodiment, to execute the self-diagnosis process of autonomous driving control logic for the host vehicle, the controller 130 may perform autonomous driving control logic based on at least one input signal among a plurality of input signals stored in the memory 120.

In one embodiment, the controller 130 may perform autonomous driving control logic using at least one sensor, by using a specified input signal including an input signal, which is associated with one of DSSAD, EDR, or any combination thereof, from among a plurality of input signals stored in the memory 120.

In one embodiment, the controller 130 may set the strength of the specified input signal to a maximum value or minimum value of input signal strengths stored in the memory 120 and then may perform autonomous driving control logic by using at least one sensor.

In one embodiment, the controller 130 may perform autonomous driving control logic by using at least one sensor and by using the specified input signal corresponding to a sinusoidal alternating current signal. The sinusoidal alternating current signal include the maximum value and minimum value of the input signal strengths stored in the memory 120 as an inflection point.

In one embodiment, the controller 130 may identify the strength of an output signal output as a result of autonomous driving control logic and may compare the strength of the output signal with an output signal strength threshold value.

In one embodiment, the controller 130 may compare the output signal of the autonomous driving control logic with the output signal strength threshold stored in the memory 120.

In one embodiment, the controller 130 may release the limit of the output signal strength of the autonomous driving control logic and then may determine whether the output signal strength exceeds an output signal strength threshold value stored in the memory 120.

When the strength of the output signal exceeds the output signal strength threshold value, the controller 130 may store at least one parameter for executing the autonomous driving control logic being used at the corresponding time in the memory 120.

For example, the controller 130 may store, in the memory 120, at least one of a filter coefficient applied to at least one adaptive filter, a specified input signal, an output signal, or any combination thereof.

In one embodiment, when the strength of the output signal exceeds the output signal strength threshold value, the controller 130 may transmit, to an external device (e.g., a data server), at least one parameter for executing autonomous driving control logic being used at the corresponding time. For example, the controller 130 may receive, from an external device, update information generated to correspond to at least one parameter. The controller 130 may update a pre-defined filter coefficient threshold value based on at least part of the update information and may turn off a constant power supply BAT of the host vehicle.

According to an embodiment, the autonomous driving control apparatus 100 may correct a filter coefficient or update a filter coefficient threshold value further based on various pieces of data.

For example, the autonomous driving control apparatus 100 may correct the filter coefficient or update the filter coefficient threshold value by reflecting a calibration value included in at least one sensor itself.

In one embodiment, to solve issues of accuracy degradation due to a deterioration state of at least one sensor, the autonomous driving control apparatus 100 may correct the filter coefficient or update the filter coefficient threshold value by using at least one of the calibration value included in the sensor itself, a time point of mass production of the sensor, the change amount of the calibration value, or any combination thereof.

For example, the autonomous driving control apparatus 100 may correct the filter coefficient or update the filter coefficient threshold value based on the reliability of sensor data identified during the driving of the host vehicle.

In one embodiment, when the accuracy of data regarding a specific object (e.g., landmark) obtained by using at least one sensor decreases or an unstable sensing operation continues, the autonomous driving control apparatus 100 may correct the filter coefficient or update the filter coefficient threshold value by using the reliability of the corresponding data.

In one embodiment, when the reliability is updated by updating the data regarding a specific object obtained by using at least one sensor or restarting autonomous driving to obtain sensor data, the autonomous driving control apparatus 100 may correct the filter coefficient or update the filter coefficient threshold value by using the updated reliability.

The configuration of the autonomous driving control apparatus 100 shown in FIG. 1 is an example, and embodiments of the present disclosure are not limited thereto.

In one embodiment, the autonomous driving control apparatus 100 may further include a communication device (not shown) including at least one communication circuit. For example, the autonomous driving control apparatus 100 may exchange various pieces of data with an external device through the communication device.

In one embodiment, the autonomous driving control apparatus 100 may transmit at least one parameter used at a specific time point (e.g., a time point at which the strength of the output signal exceeds the output signal strength threshold value) to a data center through the communication device.

In one embodiment, the autonomous driving control apparatus 100 may receive update information generated by the data center in response to at least one parameter.

Figure 2:
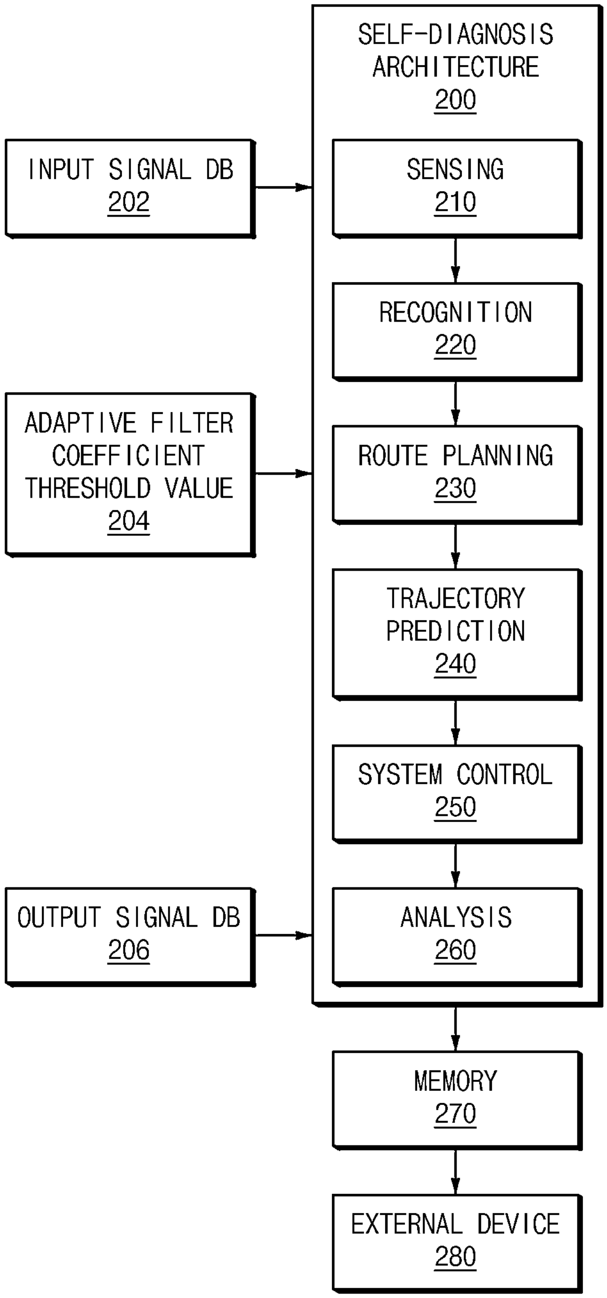
FIG. 2 is a block diagram showing self-diagnosis architecture of an autonomous driving control apparatus, according to an embodiment of the present disclosure.

FIG. 2 is a block diagram showing self-diagnosis architecture of an autonomous driving control apparatus, according to an embodiment of the present disclosure.

According to an embodiment, an autonomous driving control apparatus (e.g., the autonomous driving control apparatus 100 of FIG. 1) may perform autonomous driving control logic of a host vehicle based on self-diagnosis architecture 200.

According to an embodiment, an input signal DB 202, an adaptive filter coefficient threshold value 204, and/or an output signal DB 206 shown in FIG. 2 may be components included in a memory 270.

According to an embodiment, when the host vehicle stops driving and turns off a start, the autonomous driving control apparatus may perform the autonomous driving control logic based on the self-diagnosis architecture 200 and then may update at least one parameter for autonomous driving control or transmit the at least one parameter to an external device 280 based on the execution result.

Hereinafter, the process of autonomous driving control logic based on the self-diagnosis architecture 200 of the autonomous driving control apparatus may be performed on the premise that a filter coefficient of at least one adaptive filter is changed while the host vehicle is driving is changed from the adaptive filter coefficient threshold value 204 (or a pre-defined filter coefficient threshold value) to a specified value or more.

According to an embodiment, the autonomous driving control apparatus may perform a sensing step (operation 210).

For example, in the sensing step 210, the autonomous driving control apparatus may obtain various pieces of information required for the autonomous driving control logic by using at least one sensor.

For example, the autonomous driving control apparatus may obtain various pieces of information by controlling a sensor device (e.g., the sensor device 110 in FIG. 1) by using at least one input signal stored in the input signal DB 202.

In one embodiment, the autonomous driving control apparatus may control an information acquisition operation by using at least one sensor and by using a specified input signal from among a plurality of input signals stored in the input signal DB 202. The specified input signal includes an input signal associated with one of DSSAD, EDR, or any combination thereof.

For example, the autonomous driving control apparatus may control the information acquisition operation using at least one sensor, by using a specified input signal corresponding to a sinusoidal alternating current signal including the maximum value and minimum value of the input signal strength stored in the input signal DB 202 as an inflection point.

According to an embodiment, the autonomous driving control apparatus may perform a recognition step (operation 220).

For example, in the recognition step 220, the autonomous driving control apparatus may recognize and distinguish various pieces of information, which are obtained in the sensing step 210, from one another.

According to an embodiment, the autonomous driving control apparatus may perform a route planning step (operation 230).

For example, in the route planning step 230, the autonomous driving control apparatus may plan a driving route of the host vehicle based on the various pieces of information that are obtained in the sensing step 210 and distinguished in the recognition step 220.

According to an embodiment, the autonomous driving control apparatus may perform a trajectory prediction step (operation 240).

For example, in the trajectory prediction step 240, the autonomous driving control apparatus may predict a trajectory of the host vehicle based on the driving route planned in the route planning step 230.

According to an embodiment, the autonomous driving control apparatus may perform a system control (operation 250).

For example, in operation 250, the autonomous driving control apparatus may control an autonomous driving system by using the generated driving route and/or trajectory prediction results.

For example, the autonomous driving control apparatus may virtually perform autonomous driving control based on the generated driving route and/or trajectory prediction results and may generate an output signal.

According to an embodiment, the autonomous driving control apparatus may perform an analysis step (operation 260).

In one embodiment, in the analysis step 260, the autonomous driving control apparatus may compare the output signal output from the operation 250 with an output signal strength threshold value.

For example, the autonomous driving control apparatus may compare the output signal output as the result of performing the autonomous driving control logic with the output signal strength threshold value stored in the output signal DB 206.

In one embodiment, the autonomous driving control apparatus may release a limit of the preset output signal strength of the autonomous control logic and may determine whether the strength of the output signal output by performing the autonomous driving control logic exceeds the output signal strength threshold value stored in the output signal DB 206.

According to an embodiment, the autonomous driving control apparatus may store, in the memory 270, data related to the autonomous driving control logic according to the self-diagnosis architecture 200.

In one embodiment, when the strength of the output signal exceeds the output signal strength threshold value, the autonomous driving control apparatus may store, in the memory 270, at least one of a filter coefficient, a specified input signal, an output signal, or any combination thereof.

According to an embodiment, the autonomous driving control apparatus may transmit, to the external device 280, the data related to the autonomous driving control logic according to the self-diagnosis architecture 200.

For example, when the strength of the output signal exceeds the output signal strength threshold value, the autonomous driving control apparatus may transmit, to the external device 280, at least one of the filter coefficient, the specified input signal, the output signal, or any combination thereof.

In one embodiment, the external device 280 may generate update information about at least one adaptive filter in response to the received signals and may transmit the generated update information to the autonomous driving control apparatus.

For example, the autonomous driving control apparatus may update the adaptive filter coefficient threshold value 204 based on the update information and may turn off the constant power supply BAT of the host vehicle.

Figure 3:
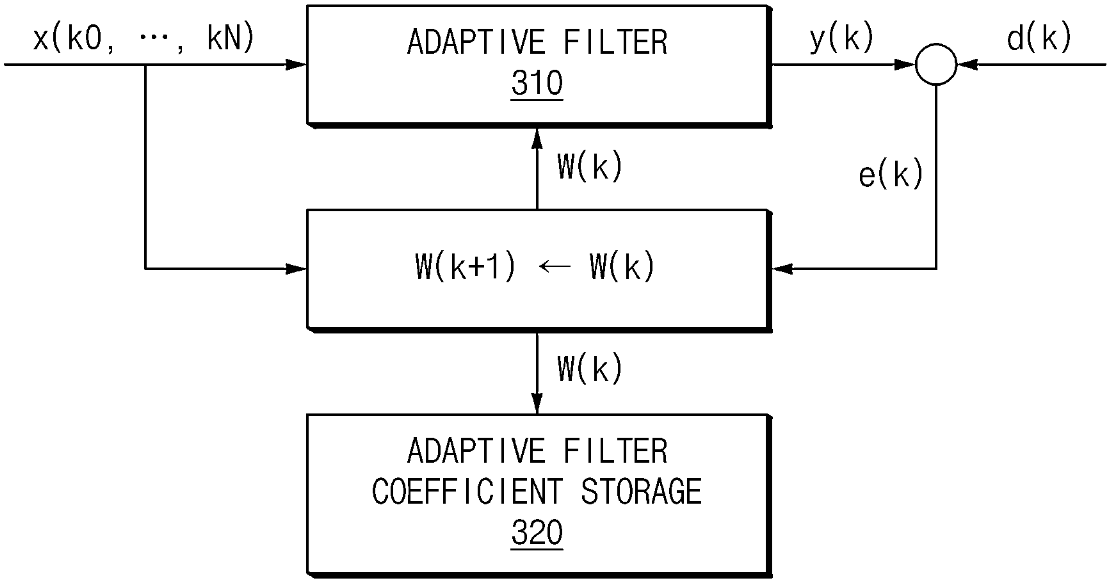
FIG. 3 is a circuit diagram illustrating a filter coefficient changing operation of an autonomous driving control apparatus, according to an embodiment of the present disclosure.

FIG. 3 is a circuit diagram illustrating a filter coefficient changing operation of an autonomous driving control apparatus, according to an embodiment of the present disclosure.

According to an embodiment, an autonomous driving control apparatus (e.g., the autonomous driving control apparatus 100 of FIG. 1) may include an adaptive filter 310 and/or adaptive filter coefficient storage 320 (or the memory 120 in FIG. 1).

According to an embodiment, the autonomous driving control apparatus may include the at least one adaptive filter 310 used for autonomous driving control. The adaptive filter 310 may control at least part of an operation of obtaining information for autonomous driving control through a sensor device (e.g., the sensor device 110 in FIG. 1). For example, the adaptive filter 310 may include at least one of an adaptive extended Kalman filter, a variable threshold value color filter, or any combination thereof.

According to an embodiment, x(k0, k1, k2, . . . , kN) may be a reference input entered into the adaptive filter 310. For example, 'k' is an input sample number. '0 to N' may be input variable indices. For example, W(k) may be at least one set of filter coefficients applied to the adaptive filter 310.

According to an embodiment, y(k) may be an output for the reference input. For example, the adaptive filter 310 may receive the reference input and then may generate an output according to y(k).

According to an embodiment, the autonomous driving control apparatus may generate error output e(k) by calculating output y(k) of the adaptive filter 310 and request input d(k). For example, the autonomous driving control apparatus may update W(k) to W(k+1) by using error output e(k).

According to an embodiment, the autonomous driving control apparatus may store a part of at least one set of filter coefficients in the adaptive filter coefficient storage 320.

For example, the autonomous driving control apparatus may store at least one of set W(k) of filter coefficients applied to the adaptive filter 310, the updated set W(k+1) of filter coefficients, or any combination thereof in the adaptive filter coefficient storage 320.

In one embodiment, when it is determined that a specified condition is satisfied, by comparing the newly created set W(k+1) of adaptive filter coefficients with the previously applied set W(k) of adaptive filter coefficients, the autonomous driving control apparatus may update the stored W(k) to W(k+1) in a situation where set W(k) of adaptive filter coefficients is stored in the adaptive filter coefficient storage 320.

For example, the specified condition may include a case where a filter coefficient is changed from a filter coefficient threshold value to a specified value or more.

For example, the specified condition may include a case where the filter coefficient exceeds a pre-defined filter coefficient threshold value by a specified value or more.

Figure 4:
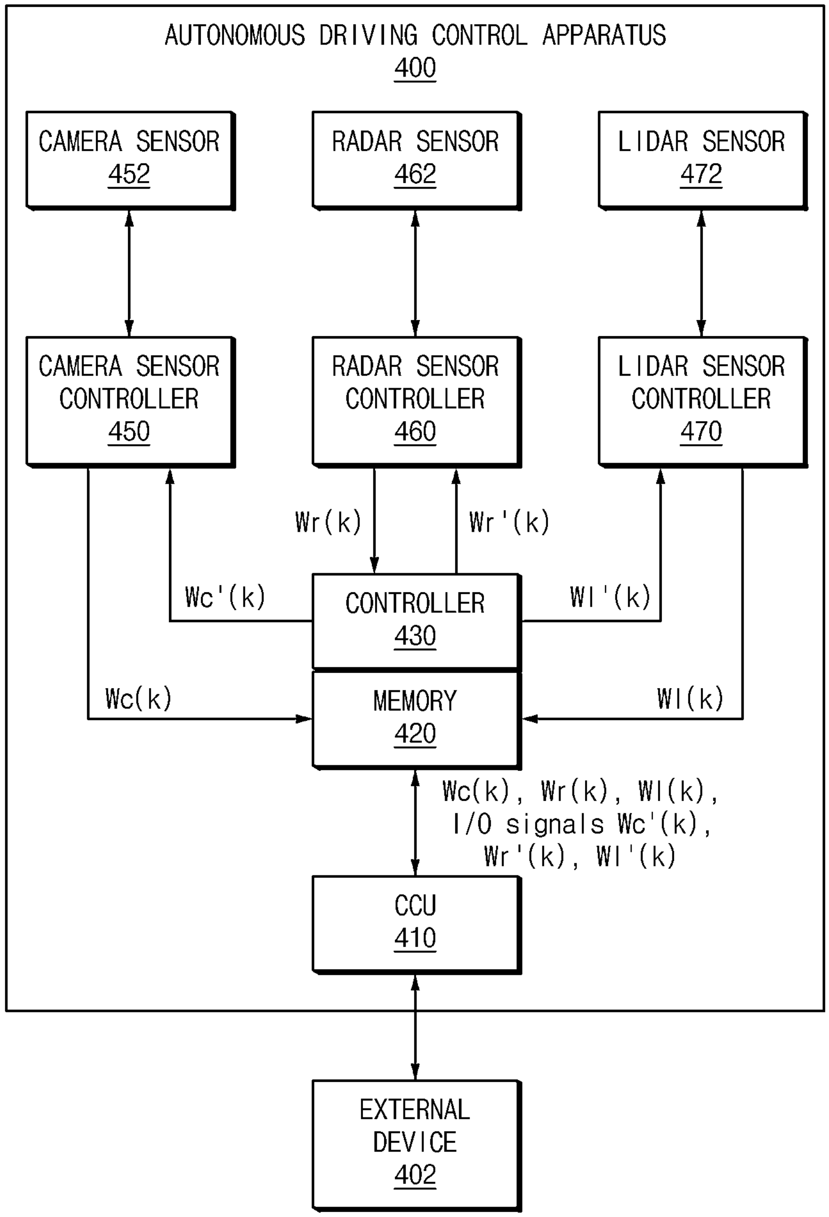
FIG. 4 is a conceptual diagram illustrating an operation of an autonomous driving control apparatus, according to an embodiment of the present disclosure.

FIG. 4 is a conceptual diagram illustrating an operation of an autonomous driving control apparatus, according to an embodiment of the present disclosure.

According to an embodiment, an autonomous driving control apparatus 400 may include at least one of a sensor device (e.g., the sensor device 110 in FIG. 1), a memory 420 (e.g., the memory 120 in FIG. 1), a controller 430 (e.g., the controller 130 in FIG. 1), a communication control unit (CCU) 410, or any combination thereof.

According to an embodiment, the sensor device may include at least one sensor including a camera sensor 452, a radar sensor 462, and/or a LiDar sensor 472. For example, the sensor device may include at least one controller (e.g., a camera sensor controller 450, a radar sensor controller 460, and/or a LiDar sensor controller 470) for controlling at least one sensor. For example, at least one controller may include at least one adaptive filter.

According to an embodiment, to control at least one sensor, the sensor device may include a filter coefficient set applied to an adaptive filter of the at least one controller.

For example, the sensor device may include a first filter coefficient set Wc(k) applied to an adaptive filter included in the camera sensor controller 450 to control the camera sensor 452.

For example, the sensor device may include a second filter coefficient set Wr(k) applied to an adaptive filter included in the radar sensor controller 460 to control the radar sensor 462.

For example, the sensor device may include a third filter coefficient set Wl(k) applied to an adaptive filter included in the LiDar sensor controller 470 to control the LiDar sensor 472.

For example, the sensor device may store, in the memory 420, filter coefficient sets applied to an adaptive filter included in at least one sensor to control at least one sensor.

According to an embodiment, the controller 430 may deliver a filter coefficient threshold value to at least one sensor controller. Accordingly, under the control of the controller 430, the filter coefficient of the adaptive filter changed in real time may be adjusted within a filter coefficient threshold value.

For example, the controller 430 may deliver a first filter coefficient threshold value Wc'(k) to the camera sensor controller 450. For example, the camera sensor controller 450 may adjust a coefficient of the adaptive filter within a first filter coefficient threshold value Wc'(k).

For example, the controller 430 may deliver a second filter coefficient threshold value Wr'(k) to the radar sensor controller 460. For example, the radar sensor controller 460 may adjust a coefficient of the adaptive filter within the second filter coefficient threshold value Wr'(k).

For example, the controller 430 may transmit a third filter coefficient threshold value Wl'(k) to the LiDar sensor controller 470. For example, the LiDar sensor controller 470 may adjust a coefficient of the adaptive filter within the third filter coefficient threshold value Wl'(k).

According to an embodiment, the controller 430 may transmit various pieces of data related to autonomous driving control to an external device 402 through the CCU 410. For example, the external device 402 may be a data server that stores and manages data related to a filter coefficient.

For example, the controller 430 may transmit at least one of input signal, output signal, filter coefficient, filter coefficient threshold value, or any combination thereof, which is used for autonomous driving control, to the external device 402 through the CCU 410.

For example, the controller 430 may receive update information from the external device 402 and then may update a filter coefficient threshold value based on the update information. For example, the external device 402 may generate the update information based on autonomous driving control-related information received from the autonomous driving control apparatus 400 and then may transmit the update information to the autonomous driving control apparatus 400.

Figure 5:
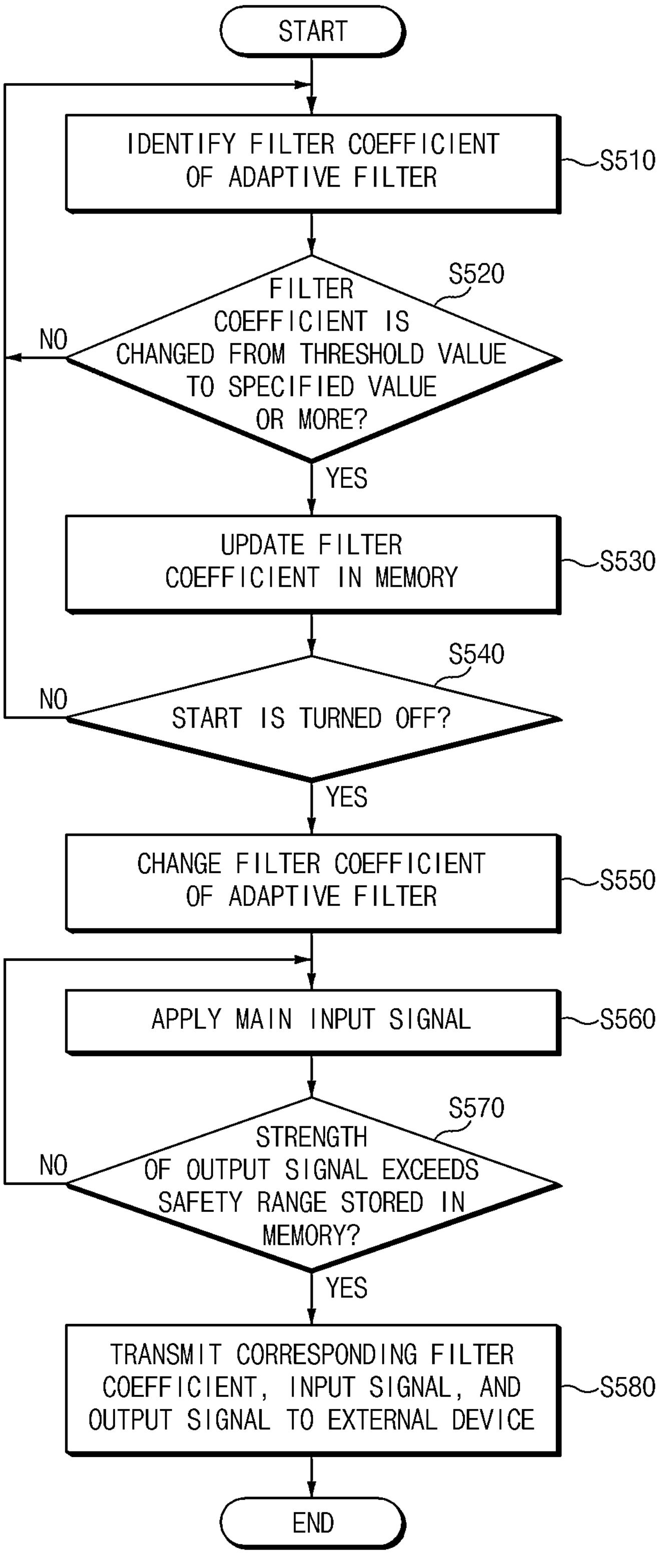
FIG. 5 is an operation flowchart of an autonomous driving control apparatus, according to an embodiment of the present disclosure.

FIG. 5 is an operation flowchart of an autonomous driving control apparatus, according to an embodiment of the present disclosure.

According to an embodiment, an autonomous driving control apparatus (e.g., the autonomous driving control apparatus 100 of FIG. 1) may perform operations described in FIG. 5. For example, at least some of components (e.g., the sensor device 110, the memory 120, and the controller 130 in FIG. 1) included in the autonomous driving control apparatus may be set to perform operations of FIG. 5.

In the following embodiment, S510 to S580 may be sequentially performed but are not always performed sequentially. For example, the order of operations may be changed, and at least two operations may be performed in parallel. Moreover, descriptions corresponding to or identical to the above-mentioned descriptions given with reference to FIG. 5 may be briefly described or omitted to avoid redundancy.

According to an embodiment, the autonomous driving control apparatus may identify a filter coefficient of an adaptive filter (S510).

For example, while a host vehicle is driving, the autonomous driving control apparatus may identify that the filter coefficient of at least one adaptive filter is changed.

According to an embodiment, the autonomous driving control apparatus may determine whether the filter coefficient is changed from a threshold value to a specified value or more (S520).

For example, the threshold value may be a pre-defined filter coefficient threshold value. For example, the autonomous driving control apparatus may determine whether a change amount of the filter coefficient is not less than the specified value, based on the pre-defined filter coefficient threshold value stored in a memory.

For example, when it is identified that the filter coefficient is changed from the threshold value to the specified value or more (e.g., S520—Yes), the autonomous driving control apparatus may perform S530.

For example, when it is identified that the filter coefficient is not changed from the threshold value to the specified value or more (e.g., S520—No), the autonomous driving control apparatus may repeatedly perform S510.

According to an embodiment, the autonomous driving control apparatus may update the filter coefficient in the memory (S530).

For example, the autonomous driving control apparatus may update and store a filter coefficient, which is previously stored in the memory, to the changed filter coefficient.

According to an embodiment, the autonomous driving control apparatus may determine whether the start of the host vehicle is turned off (S540).

For example, when it is identified that the start of the host vehicle is turned off (e.g., S540—Yes), the autonomous driving control apparatus may perform S550.

For example, when it is identified that the start of the host vehicle is not turned off (e.g., S540—No), the autonomous driving control apparatus may repeatedly perform S510.

According to an embodiment, the autonomous driving control apparatus may change the filter coefficient of the adaptive filter (S550).

For example, to perform autonomous driving control logic, the autonomous driving control apparatus may change and apply the filter coefficient of the adaptive filter to the filter coefficient identified in S510 based on self-diagnosis architecture (e.g., the self-diagnosis architecture 200 in FIG. 2).

For example, the autonomous driving control apparatus may change the filter coefficient of the adaptive filter to a filter coefficient, which corresponds to a filter coefficient threshold value, from among filter coefficients stored in the memory .

According to an embodiment, the autonomous driving control apparatus may apply a main input signal (or specified input signal) (S560).

For example, the autonomous driving control apparatus may perform autonomous driving control logic using at least one sensor, by using a specified input signal including an input signal, which is associated with one of DSSAD, EDR, or any combination thereof, from among a plurality of input signals stored in the memory.

For example, the autonomous driving control apparatus may perform autonomous driving control logic by using at least one sensor and by using the specified input signal corresponding to a sinusoidal alternating current signal. The sinusoidal alternating current signal includes the maximum value and minimum value of the input signal strengths stored in the memory as an inflection point.

For example, the autonomous driving control apparatus may set the strength of the specified input signal to a maximum value or minimum value of input signal strengths stored in the memory and then may perform autonomous driving control logic by using at least one sensor.

For example, the autonomous driving control apparatus may generate an output signal according to the result of performing autonomous driving control logic.

According to an embodiment, the autonomous driving control apparatus may determine whether the strength of the output signal exceeds a safety range stored in the memory (S570).

For example, the autonomous driving control apparatus may compare the output signal output as the result of performing the autonomous driving control logic with the output signal strength threshold value stored in the memory.

For example, when the output signal exceeds the output signal strength threshold value, the autonomous driving control apparatus may identify that the threshold value of the filter coefficient for autonomous driving control logic needs to be changed.

For example, when it is identified that the strength of the output signal exceeds the safe range stored in the memory (e.g., S570—Yes), the autonomous driving control apparatus may perform S580.

For example, when it is identified that the strength of the output signal does not exceed the safe range stored in the memory (e.g., S570—No) , the autonomous driving control apparatus may repeatedly perform S560.

According to an embodiment, the autonomous driving control apparatus may transmit the corresponding filter coefficient, input signal, and output signal to an external device (S580).

For example, the autonomous driving control apparatus may transmit at least one of the filter coefficient, input signal, output signal, or any combination thereof used for the execution of the autonomous driving control logic to an external device (or a data server).

For example, the autonomous driving control apparatus may receive update information from the external device and then may update the filter coefficient threshold value based on the received update information.

Figure 6:
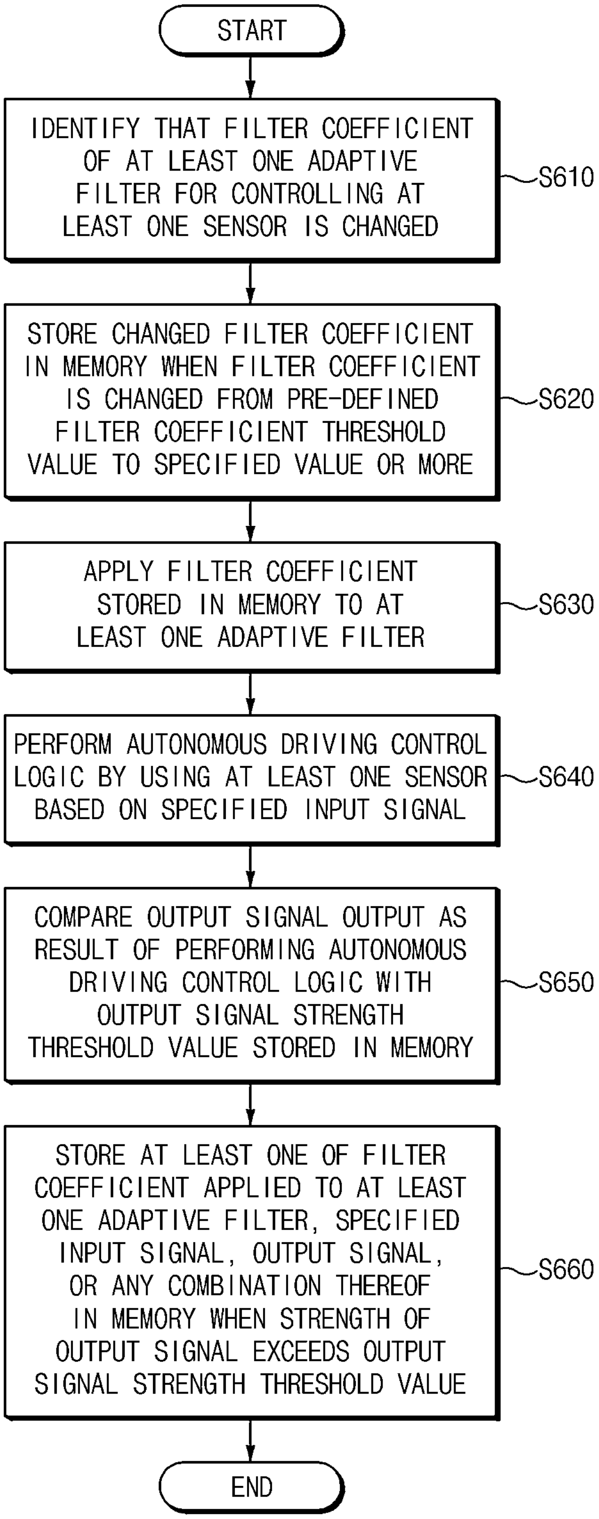
FIG. 6 is an operation flowchart of an autonomous driving control apparatus, according to an embodiment of the present disclosure.

FIG. 6 is an operation flowchart of an autonomous driving control apparatus, according to an embodiment of the present disclosure.

According to an embodiment, an autonomous driving control apparatus (e.g., the autonomous driving control apparatus 100 of FIG. 1) may perform operations described in FIG. 6. For example, at least some of components (e.g., the sensor device 110, the memory 120, and the controller

130 in FIG. 1) included in the autonomous driving control apparatus may be set to perform operations of FIG. 6.

In the following embodiment, S610 to S660 may be sequentially performed but are not always performed sequentially. For example, the order of operations may be changed, and at least two operations may be performed in parallel. Moreover, descriptions corresponding to or identical to the above-mentioned descriptions given with reference to FIG. 6 may be briefly described or omitted to avoid redundancy.

According to an embodiment, the autonomous driving control apparatus may identify that the filter coefficient of at least one adaptive filter for controlling at least one sensor is changed (S610).

For example, while a host vehicle is driving, the autonomous driving control apparatus may identify that the filter coefficient of at least one adaptive filter is changed.

According to an embodiment, when the filter coefficient is changed from the pre-defined filter coefficient threshold value to the specified value or more, the autonomous driving control apparatus may store the changed filter coefficient in a memory (S620).

For example, the threshold value may be a pre-defined filter coefficient threshold value. For example, the autonomous driving control apparatus may determine whether a change amount of the filter coefficient is not less than the specified value, based on the pre-defined filter coefficient threshold value stored in the memory.

For example, the autonomous driving control apparatus may update and store a filter coefficient, which is previously stored in the memory, to the changed filter coefficient.

According to an embodiment, the autonomous driving control apparatus may apply the filter coefficient stored in the memory to at least one adaptive filter (S630).

For example, to perform autonomous driving control logic, the autonomous driving control apparatus may change and apply the filter coefficient of the adaptive filter to the filter coefficient identified in S510 based on self-diagnosis architecture (e.g., the self-diagnosis architecture 200 in FIG. 2).

For example, the autonomous driving control apparatus may change the filter coefficient of the adaptive filter to a filter coefficient, which corresponds to a filter coefficient threshold value, from among filter coefficients stored in the memory.

According to an embodiment, the autonomous driving control apparatus may perform autonomous driving control logic by using at least one sensor based on a specified input signal (S640).

According to an embodiment, the autonomous driving control apparatus may compare the output signal output as the result of performing the autonomous driving control logic with the output signal strength threshold value stored in the memory (S650).

According to an embodiment, when the strength of the output signal exceeds the output signal strength threshold value, the autonomous driving control apparatus may store, in the memory, at least one of a filter coefficient applied to at least one adaptive filter, a specified input signal, an output signal, or any combination thereof (S660).

For example, when the output signal exceeds the output signal strength threshold value, the autonomous driving control apparatus may identify that the threshold value of the filter coefficient for autonomous driving control logic needs to be changed.

For example, the autonomous driving control apparatus may transmit at least one of the filter coefficient, input signal, output signal, or any combination thereof used for the execution of the autonomous driving control logic to an external device (or a data server).

For example, the autonomous driving control apparatus may receive update information from the external device and then may update the filter coefficient threshold value based on the received update information.

Figure 7:
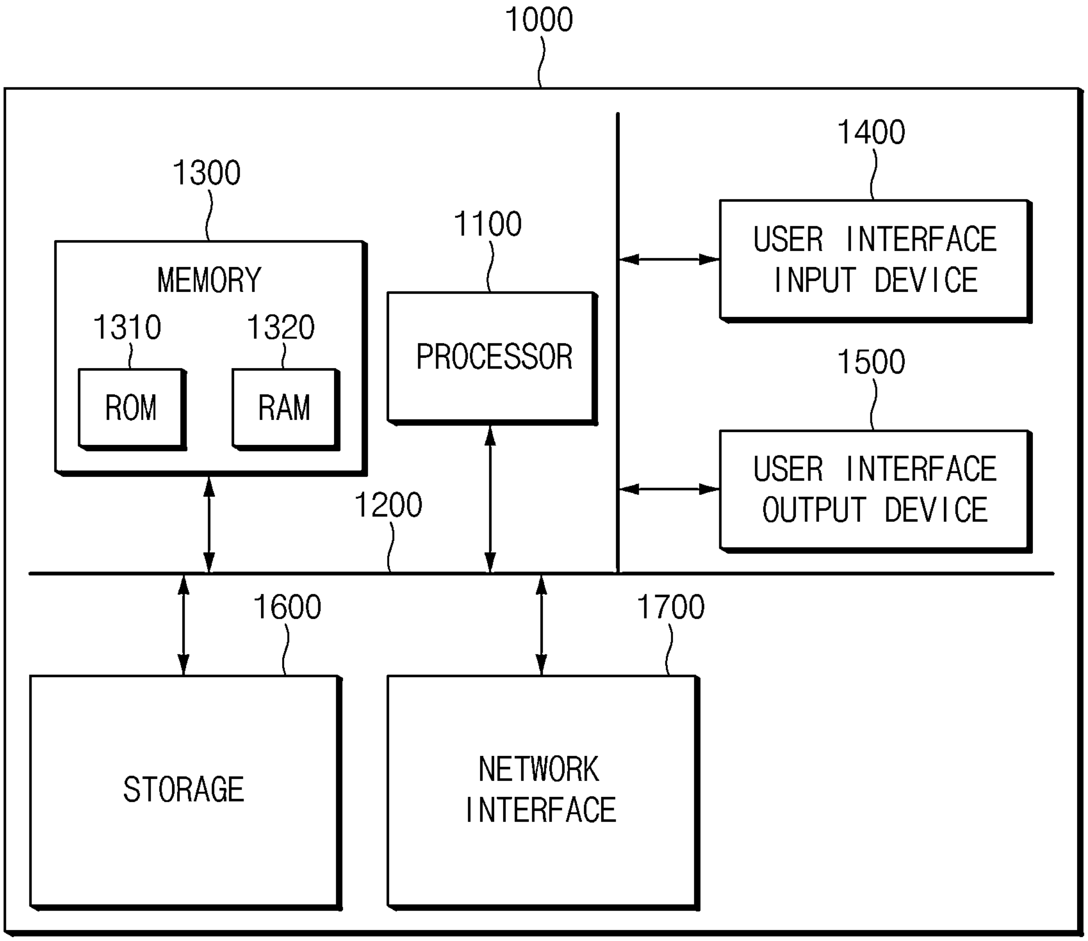
FIG. 7 illustrates a computing system related to an autonomous driving control method, according to an embodiment of the present disclosure.

FIG. 7 illustrates a computing system related to an autonomous driving control method, according to an embodiment of the present disclosure.

Referring to FIG. 7, a computing system 1000 related to an autonomous driving control method may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

The above description is merely an example of the technical idea of the present disclosure, and various modifications may be made by one having ordinary skill in the art without departing from the essential characteristic of the present disclosure.

Accordingly, embodiments of the present disclosure are intended not to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

Descriptions of an autonomous driving control apparatus according to an embodiment of the present disclosure, and a method thereof are as follows.

According to at least one of embodiments of the present disclosure, in a situation where at least one filter is used for autonomous driving control of a host vehicle, an autonomous driving control apparatus may perform a convenient and quick filter coefficient correction algorithm by performing self-diagnosis (e.g., performing autonomous driving control logic).

Moreover, according to at least one of embodiments of the present disclosure, an autonomous driving control apparatus may accurately remove noise output from an adaptive filter. At the same time, the autonomous driving control apparatus may provide a safe autonomous driving environment to a user by setting a more accurate adaptive filter coefficient for autonomous driving control.

Besides, a variety of effects directly or indirectly understood through the specification may be provided.

Hereinabove, although the present disclosure has been described with reference to embodiments and the accompanying drawings, the present disclosure is not limited thereto but may be variously modified and altered by those having ordinary skill in the art to which the present disclosure pertains without departing from the spirit and scope of the present disclosure.

What is claimed is:

1. An autonomous driving control apparatus, the apparatus comprising:
- a sensor device including at least one sensor;
- a memory configured to store one or more instructions; and
- a controller operatively connected to the sensor device and the memory,
- wherein the instructions, when executed by the controller, cause the autonomous driving control apparatus to:
- identify that a filter coefficient of adaptive filter for controlling the at least one sensor is changed;
- store the changed filter coefficient in the memory when the filter coefficient exceeds a threshold value by a specified value or more;
- apply the changed filter coefficient, which is stored in the memory, to the adaptive filter;
- perform autonomous driving control logic by using the at least one sensor based on a specified input signal;
- compare a strength of an output signal, which is output as a result of performing the autonomous driving control logic, with an output signal strength threshold value stored in the memory; and
- store, in the memory, the changed filter coefficient applied to the adaptive filter, the specified input signal, and the output signal when the strength of the output signal exceeds the output signal strength threshold value,
- wherein the filter coefficient is updated to the changed filter coefficient based on an error output, and the error output is generated by calculating an output value of the adaptive filter based on a reference input and a required input.

2. The apparatus of claim 1, wherein the instructions, when executed by the controller, cause the autonomous driving control apparatus to:
- perform the autonomous driving control logic using the at least one sensor, by using the specified input signal including an input signal, which is associated with one of data storage system for automated driving (DSSAD), event data recorders (EDR), or a combination of the DSSAD and the EDR, from among a plurality of input signals stored in the memory.

3. The apparatus of claim 1, wherein the instructions, when executed by the controller, cause the autonomous driving control apparatus to:
- perform the autonomous driving control logic by using the at least one sensor by setting a strength of the specified input signal to a maximum value or a minimum value among input signal strengths stored in the memory.

4. The apparatus of claim 1, wherein the instructions, when executed by the controller, cause the autonomous driving control apparatus to:
- perform the autonomous driving control logic using the at least one sensor, by using the specified input signal corresponding to a sinusoidal alternating current signal including a maximum value and a minimum value among input signal strengths stored in the memory as an inflection point.

5. The apparatus of claim 1, wherein the instructions, when executed by the controller, cause the autonomous driving control apparatus to:
- release an output signal strength limit of the autonomous driving control logic; and
- determine whether the strength of the output signal output by performing the autonomous driving control logic exceeds the output signal strength threshold value stored in the memory.

6. The apparatus of claim 1, wherein the at least one sensor includes at least one of a camera sensor, a radar sensor, a LiDar sensor, or a combination of the camera sensor, the radar sensor, and the LiDar sensor.

7. The apparatus of claim 1, wherein the instructions, when executed by the controller, cause the autonomous driving control apparatus to:
- apply the changed filter coefficient, which is stored in the memory, to the adaptive filter when it is identified that a host vehicle stops driving and turns off a start.

8. The apparatus of claim 1, wherein the instructions, when executed by the controller, cause the autonomous driving control apparatus to:
- transmit, to an external device, the changed filter coefficient, the specified input signal, and the output signal when the strength of the output signal exceeds the output signal strength threshold value; and
- receive update information about the adaptive filter from the external device.

9. The apparatus of claim 1, wherein the instructions, when executed by the controller, cause the autonomous driving control apparatus to:
- update the threshold value based on update information and allow a constant power supply BAT of a host vehicle to be turned off.

10. An autonomous driving control method, the method comprising:
- identifying, by a controller, that a filter coefficient of adaptive filter for controlling at least one sensor is changed;
- storing, by the controller, the changed filter coefficient in a memory when the filter coefficient exceeds a threshold value by a specified value or more;
- applying, by the controller, the changed filter coefficient, which is stored in the memory, to the adaptive filter;
- performing, by the controller, autonomous driving control logic by using the at least one sensor based on a specified input signal;
- comparing, by the controller, a strength of an output signal, which is output as a result of performing the autonomous driving control logic, with an output signal strength threshold value stored in the memory; and
- storing, by the controller, the changed filter coefficient applied to the adaptive filter, the specified input signal, and the output signal in the memory, when the strength of the output signal exceeds the output signal strength threshold value, wherein the filter coefficient is updated to the changed filter coefficient based on an error output, and the error output is generated by calculating an output value of the adaptive filter based on a reference input and a required input.

11. The method of claim 10, wherein the performing, by the controller, of the autonomous driving control logic by using the at least one sensor based on the specified input signal includes:

performing the autonomous driving control logic using the at least one sensor, by using the specified input signal including an input signal, which is associated with one of DSSAD, EDR, or a combination of the DSSAD and the EDR, from among a plurality of input signals stored in the memory.

12. The method of claim 10, wherein the performing, by the controller, of the autonomous driving control logic by using the at least one sensor based on the specified input signal includes:

performing the autonomous driving control logic by using the at least one sensor by setting a strength of the specified input signal to a maximum value or a minimum value among input signal strengths stored in the memory.

13. The method of claim 10, wherein the performing, by the controller, of the autonomous driving control logic by using the at least one sensor based on the specified input signal includes:

performing the autonomous driving control logic using the at least one sensor, by using the specified input signal corresponding to a sinusoidal alternating current signal including a maximum value and a minimum value among input signal strengths stored in the memory as an inflection point.

14. The method of claim 10, wherein the comparing, by the controller, of the output signal, which is output as the result of performing the autonomous driving control logic, with the output signal strength threshold value stored in the memory includes:

releasing an output signal strength limit of the autonomous driving control logic; and determining whether the strength of the output signal output by performing the autonomous driving control logic exceeds the output signal strength threshold value stored in the memory.

15. The method of claim 10, wherein the at least one sensor includes at least one of a camera sensor, a radar sensor, a LiDar sensor, or a combination of the camera sensor, the radar sensor, and the LiDar sensor.

16. The method of claim 10, wherein the applying, by the controller, of the filter coefficient, which is stored in the memory, to the adaptive filter includes:

applying the changed filter coefficient, which is stored in the memory, to the adaptive filter when it is identified that a host vehicle stops driving and turns off a start.

17. The method of claim 10, further comprising:

transmitting, to an external device, the changed filter coefficient, the specified input signal, and the output signal when the strength of the output signal exceeds the output signal strength threshold value; and receiving update information about the adaptive filter from the external device.

18. The method of claim 10, further comprising:

updating the threshold value based on update information and allowing a constant power supply BAT of a host vehicle to be turned off.

* * * * *